Dec. 15, 1953  G. D. DUNCAN, JR  2,662,561
TIMBER-MOWING SAW ATTACHMENT FOR TRACTORS
Filed Nov. 18, 1949

INVENTOR:
GEORGE D. DUNCAN, JR.

BY

ATTORNEYS.

Patented Dec. 15, 1953

2,662,561

UNITED STATES PATENT OFFICE 2,662,561

TIMBER-MOVING SAW ATTACHMENT FOR TRACTORS

George D. Duncan, Jr., Fulton, Mo.

Application November 18, 1949, Serial No. 128,125

3 Claims. (Cl. 143—43)

This invention relates to power saws and particularly to power saws attached to motor driven vehicles.

Much difficulty has heretofore been experienced in clearing brush too heavy for a mower and too light to warrant the use of a heavy power tree saw, as those saws have been constructed.

One object of this invention is to provide a power saw capable of cutting heavy brush and light trees as it is moved along the ground. Another object is to provide such a saw which will not foul against obstructions or the ground. Further objects will appear to those skilled in the art when the following description is considered with the accompanying drawings, setting forth illustrative embodiments of this invention. It will be understood, however, that the invention is capable of various embodiments within the scope of the appended claims.

In accordance with an illustrative embodiment of this invention, a power driven vehicle such as a tractor, truck, or "jeep," having a power take-off, is equipped with a boom pivotally connected to the vehicle, and provided on its unpivoted end with a shoe which in normal operation rests on the ground, and a power saw attached to the boom and above the shoe. The blade of the saw is normally horizontal and the shoe, maintaining the blade a short distance from the ground, allows the saw to be moved along the ground, clearing as it moves. The saw is driven by a shaft which may be positioned within the boom or externally thereof. A counter-balancing system is arranged to support the boom so as to allow the shoe to "float" along the ground. The counter-balancing device is so constructed that in normal operation the shoe remains in contact with the ground and supports a portion of the weight of the device. However, if the shoe encounters a considerable depression, for example, in crossing a deep furrow or a gulley, the counter-balancing device supports the saw and lifts it, if need be, from the ground to prevent the saw's digging into the ground. On the other hand, even in level operation the counter-balancing device gives sufficient support so that if a stump or other obstruction is struck by the saw blade or the shoe, the saw, shoe, drive shaft and boom are "kicked over" behind the vehicle, to avoid fouling of the blade and injury to the saw.

Figure 1:
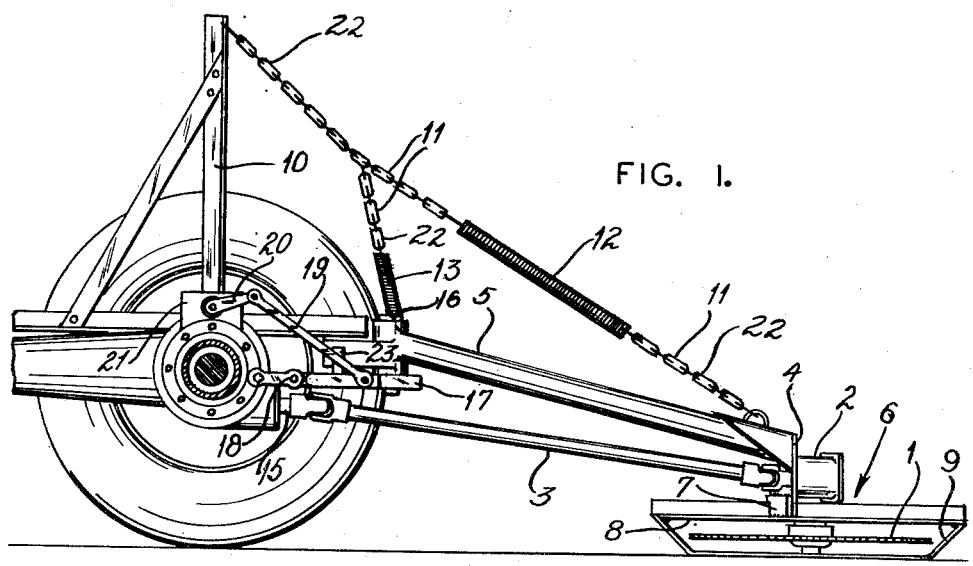
Figure 1 is a side view of one embodiment of the invention.
Figure 2:
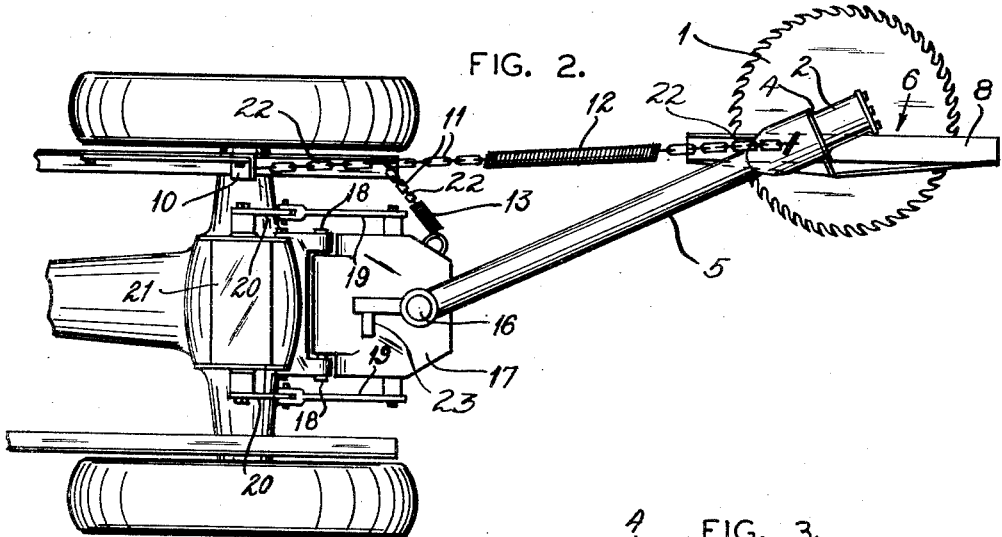
Figure 2 is a plan view of one embodiment of the invention.

Referring to the drawings, Figures 1 and 2 illustrate one embodiment of this invention attached to a tractor of the Fordson type, having an adjustable drawbar of the kind commonly associated therewith. 1 represents a horizontal saw blade driven through gearings in a gear box 2 by a drive shaft 3 which, in Figures 1 and 2, is connected to a power take-off 15 on a tractor. The gear box 2 is fastened to a supporting bracket 4 forming a part of a boom 5 which is pivoted at its other end to the vehicle. In the embodiment shown in Figures 1 and 2, this pivotal connection 16 is secured to an adjustable drawbar 17 of the usual type hinged at 18, and having a link 19 connected to the drawbar at one end and to a lever 20 at the other, lever 20 being connected to a hydraulic elevating mechanism 21 by which the drawbar and the attached saw may be lifted or lowered. The hydraulic system, however, is normally not activated while the saw is in use, so that the attachment is capable of both horizontal motion about pivot 16, and free vertical motion about a hinge 18. In the embodiment shown, a stop 23 is provided to limit the horizontal motion of the boom in one direction to the proper operating position. A similar arrangement can be used on vehicles which are not supplied with adjustable drawbars by providing a plate hinged to allow for vertical travel of the boom but without allowing rotation of the attachment about the boom's axis, and with a pivotal connection to allow horizontal movement. Other arrangements, such as the provision on a stationary drawbar of an upright pivot inclined somewhat from the vertical, will be apparent to those skilled in the art. A shoe 6 is fastened to the supporting plate 4. Shoe 6 consists of a shoe bracket 7, by means of which the shoe is secured to the supporting plate 4, a top plate 8, and sled 9, extending beneath the blade 1.

In the embodiment shown, the counter-balancing device consists of a frame 10 and springs 12 and 13 with guys 11 which may be chains, rods, cables, or the like, connecting the springs with the frame 10 and boom 5, and turnbuckles 22 for adjustably tensioning the device as shown in Figures 1 and 2. Spring 12 is connected by guys to the boom 5 toward the boom's lower end, tending to support the boom vertically and to maintain the saw's position at one side of the vehicle. Spring 13 is connected to the hinged drawbar 17 to support the attachment vertically.

Figure 3:
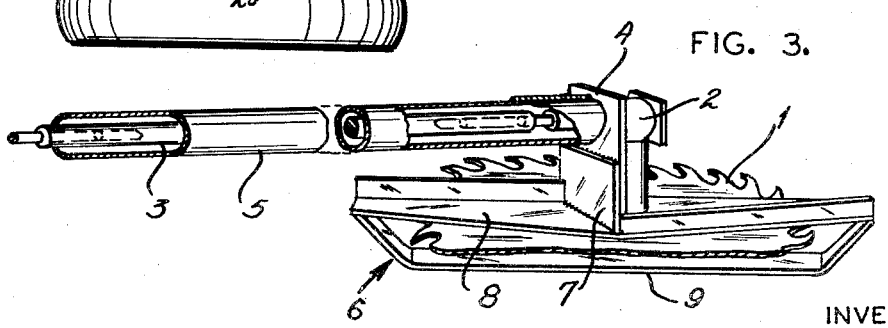
Figure 3 is a detail perspective view, showing another embodiment of this invention.

As can be seen from the accompanying drawings, particularly Figure 2, the shoe 6 is fastened to boom 5 at such an angle that the long axis of shoe 6 is substantially parallel with that of the vehicle to which it is attached, so that the shoe and saw track with the vehicle. The guys of the counter-balancing device are fastened to the frame 10 toward the side of the vehicle along which the saw is to be pulled, so that the saw is maintained in its cutting position by two forces. It can be seen that by proper tensioning of the springs 12 and 13 the boom may be balanced sufficiently to allow the floating ride referred to, and to allow the attachment to swing behind the vehicle if the blade should hit some obstruction. By positioning the guys on the frame toward the side of the vehicle behind which the saw extends, the tension on the spring 12 is increased when the saw is swung behind the vehicle, tending to lift the saw and to restore it to its position rapidly. Thus the counter-balancing springs and the angle of the shoe 6 will quickly restore the saw to its normal operating position. If it is desired, a guard may be provided around the exposed but non-working edge of the saw. In the embodiment shown in Figure 3, the drive shaft 3 is positioned within the boom 5.

In operation, the saw, tracking close to and partly directly behind the vehicle, cuts a continuous swath even in dense brush. The operator of the vehicle, especially of a tractor or jeep, is in an excellent position to observe the action of the saw, and to avoid large rocks and stumps, since the front and rear wheels on one side of the vehicle will pass ahead and within a short distance of the saw's path. When an obstruction is met by the blade, the saw is swung away by its own force and lifted slightly by the counter-balancing device. The counter-balancing device tends immediately to restore it to its normal position, and when the shoe is in engagement with the ground, the angle which it makes therewith also tends to move it toward the position in which its axis is parallel to that of the vehicle.

A sturdy, efficient device is thus provided which fills a long standing need, allowing land to be cleared of heavy brush and light trees in a small fraction of the time that such clearing would require by hand.

It is obvious that various modifications may be made, as for example, in a different arrangement of counter-balancing means or form of sled, without departing from the spirit of this invention.

Having thus described the invention, what is claimed and desired to be secured by Letters Patent is:

1. In combination with a tractor having a horizontally pivoted drawbar, a saw attachment comprising a vertical pivot mounted on said drawbar, a stop mounted on said drawbar, a boom mounted on said vertical pivot for free swinging behind the tractor transversely thereof, a saw, having a substantially horizontal blade, mounted on the free end of said boom, a lug on the pivoted end of said boom engaging the stop on the drawbar at a position such that a portion of the blade of said saw extends beyond one side of said tractor, a ground-engaging shoe extending beneath the blade, the long axis of said shoe being substantially parallel with the direction of travel of the tractor when said lug and said stop are engaged, said shoe being positioned to leave unobstructed that portion of the blade which extends beyond the side of the tractor.

2. In combination with a motor-driven vehicle, a saw attachment to be pulled behind said vehicle comprising a boom one end of which is pivotally mounted on the rear of said vehicle for swinging transversely thereof behind said vehicle; a circular saw, mounted on the other end of said boom, the blade of said saw being substantially horizontal; and a narrow, ground-engaging shoe extending beneath the blade of the saw, the position of said shoe with respect to said blade being such that the blade is clear along one side of the long axis of said shoe, said boom being biased toward a position at which the clear portion of said blade extends outboard of a side of said vehicle, the long axis of said shoe being substantially parallel with that of the vehicle when the boom is in its biased position.

3. In combination with a motor-driven vehicle, a saw attachment to be pulled behind said vehicle comprising a boom one end of which is pivotally mounted on the rear of said vehicle for swinging transversely thereof behind said vehicle; a circular saw, mounted on the other end of said boom the blade of said saw being substantially horizontal; a narrow ground-engaging shoe extending beneath the blade of the saw, the position of said shoe with respect to said blade being such that the blade is clear along one side of the long axis of said shoe, said boom being biased toward a position at which the clear portion of said blade extends outboard of a side of said vehicle, the long axis of said shoe being substantially parallel with that of the vehicle when the boom is in its biased position, and counter-balancing means supporting said boom to lift the boom when the boom is swung behind the vehicle against its normal bias.

GEORGE D. DUNCAN, Jr.

References Cited in the file of this patent

UNITED STATES PATENTS

| Number | Name | Date |
|---|---|---|
| 136,712 | Driesslin | Mar. 11, 1873 |
| 1,298,270 | Weborg | Mar. 25, 1919 |
| 1,710,749 | Svendgaard | Apr. 30, 1929 |
| 1,830,871 | Domagala | Nov. 10, 1931 |
| 2,050,952 | Jaques | Aug. 11, 1936 |
| 2,214,334 | Knight | Sept. 10, 1940 |
| 2,216,971 | Farmer | Oct. 8, 1940 |
| 2,312,287 | Renner | Feb. 23, 1943 |
| 2,410,508 | Lamme | Nov. 5, 1946 |
| 2,439,607 | Irwin | Apr. 13, 1948 |
| 2,490,870 | Heyn | Dec. 13, 1948 |